US010242810B2

United States Patent
Mahajan et al.

(10) Patent No.: US 10,242,810 B2
(45) Date of Patent: Mar. 26, 2019

(54) BI-STABLE KEYCAP DISPLAY

(71) Applicant: Intel Corporation, Santa Clara, CA (US)

(72) Inventors: Ayeshwarya B. Mahajan, Bangalore (IN); Sukanya Sundaresan, Karnataka (IN); Woojong Kang, Gyeonggi-do (KR)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/716,554

(22) Filed: Sep. 27, 2017

(65) Prior Publication Data
US 2018/0158625 A1 Jun. 7, 2018

(30) Foreign Application Priority Data
Dec. 5, 2016 (IN) .............................. 201641041470

(51) Int. Cl.
G06F 3/02 (2006.01)
H01H 3/12 (2006.01)
(Continued)

(52) U.S. Cl.
CPC ........... H01H 3/125 (2013.01); G06F 3/0202 (2013.01); G06F 3/0219 (2013.01);
(Continued)

(58) Field of Classification Search
CPC ............. H01H 13/83; H01H 2219/002; H01H 2219/0023; G06F 3/0202; G06F 3/0219; G09G 2300/0426
See application file for complete search history.

(56) References Cited

U.S. PATENT DOCUMENTS 4,551,717 A * 11/1985 Dreher .................. G06F 3/0238
200/314
4,853,888 A * 8/1989 Lata ...................... G06F 3/0238
341/23
(Continued)

FOREIGN PATENT DOCUMENTS

JP 2004184945 A 7/2004
JP 2008250259 A 10/2008
(Continued)

OTHER PUBLICATIONS

International Search Report and Written Opinion in International Patent Application No. PCT/US2016/025767 dated Jul. 20, 2016, 9 pages).

(Continued)

Primary Examiner — Vanessa Girardi
(74) Attorney, Agent, or Firm — Patent Capital Group

(57) ABSTRACT

Particular embodiments described herein provide a keycap that includes a plurality of front plane elements, where each front plane element includes a top electrode, a conductive region under each of the plurality of front plane elements, where each conductive region includes a bottom electrode and a top electrode coupling area, where each top electrode coupling area is electrically coupled to a common top electrode node, an electrical path between each top electrode and each corresponding top electrode coupling area such that each top electrode is connected to the common top electrode node, and a dielectric between each top electrode and each bottom electrode.

25 Claims, 7 Drawing Sheets

(51) Int. Cl.
*H01H 13/7065* (2006.01)
*H01H 13/79* (2006.01)

(52) U.S. Cl.
CPC ........ *H01H 13/7065* (2013.01); *H01H 13/79* (2013.01); *G09G 2300/0426* (2013.01); *H01H 2203/038* (2013.01)

(56) References Cited

U.S. PATENT DOCUMENTS

| | | | |
|---|---|---|---|
| 6,704,004 | B1 | 3/2004 | Östergård et al. |
| 6,797,902 | B2 | 9/2004 | Farage et al. |
| 6,798,359 | B1 * | 9/2004 | Ivancic ................. G06F 3/0231 341/23 |
| 8,350,728 | B2 | 1/2013 | Liu et al. |
| 2002/0022113 | A1 | 2/2002 | Kimura |
| 2003/0058223 | A1 * | 3/2003 | Tracy ................... G06F 3/0238 345/169 |
| 2004/0217939 | A1 * | 11/2004 | Levy ..................... G06F 3/0202 345/156 |
| 2006/0179088 | A1 | 8/2006 | Kang |
| 2008/0011596 | A1 | 1/2008 | Lee et al. |
| 2008/0024425 | A1 | 1/2008 | Shido |
| 2011/0056814 | A1 | 3/2011 | Cheng |
| 2011/0148766 | A1 | 6/2011 | Huang |
| 2013/0076634 | A1 | 3/2013 | Pedersen et al. |
| 2014/0028564 | A1 | 1/2014 | Valentine et al. |
| 2015/0084871 | A1 * | 3/2015 | Yarvis ................... G06F 3/0238 345/172 |
| 2018/0226210 | A1 | 8/2018 | Varghese et al. |
| 2018/0233307 | A1 | 8/2018 | Sundaresan et al. |

FOREIGN PATENT DOCUMENTS

| | | |
|---|---|---|
| KR | 20110068209 A | 6/2011 |
| WO | 2017023371 A1 | 2/2017 |
| WO | 2017023372 A1 | 2/2017 |

OTHER PUBLICATIONS

International Search Report and Written Opinion in International Patent Application No. PCT/US2016/025768 dated Jul. 12, 2016, 9 pages).
U.S. Appl. No. 15/749,393, filed Jan. 31, 2018, entitled "Keycap With Active Elements," Inventors: Regi Varghese et al.
U.S. Appl. No. 15/749,483, filed Jan. 31, 2018, entitled "Keycap With an Active Element," Inventors: Sukanya Sundaresan et al.
Non Final Office Action in U.S. Appl. No. 15/749,393 dated Oct. 4, 2018, 10 pages.
Non Final Office Action in U.S. Appl. No. 15/749,483 dated Jul. 25, 2018, 18 pages.

* cited by examiner

BI-STABLE KEYCAP DISPLAY

CROSS-REFERENCE TO RELATED APPLICATIONS

This patent application claims the benefit of India Provisional Patent Application No. 201641041470, filed Dec. 5, 2016, entitled "BI-STABLE DISPLAY", which is incorporated by reference herein in its entirety.

TECHNICAL FIELD

This disclosure relates in general to the field of electronic devices, and more particularly, to a bi-stable display.

BRIEF DESCRIPTION OF THE DRAWINGS

To provide a more complete understanding of the present disclosure and features and advantages thereof, reference is made to the following description, taken in conjunction with the accompanying FIGURES, embodiments are illustrated by way of example and not by way of limitation in the FIGURES of the accompanying drawings, in which like references indicate similar elements and in which.

The FIGURES of the drawings are not necessarily drawn to scale, as their dimensions can be varied considerably without departing from the scope of the present disclosure.

DETAILED DESCRIPTION

The following detailed description sets forth examples of apparatuses, methods, and systems relating to a system for enabling a bi-stable display. Features such as structure(s), function(s), and/or characteristic(s), for example, are described with reference to one embodiment as a matter of convenience; various embodiments may be implemented with any suitable one or more of the described features.

In the following description, various aspects of the illustrative implementations will be described using terms commonly employed by those skilled in the art to convey the substance of their work to others skilled in the art. However, it will be apparent to those skilled in the art that the embodiments disclosed herein may be practiced with only some of the described aspects. For purposes of explanation, specific numbers, materials and configurations are set forth in order to provide a thorough understanding of the illustrative implementations. However, it will be apparent to one skilled in the art that the embodiments disclosed herein may be practiced without the specific details. In other instances, well-known features are omitted or simplified in order not to obscure the illustrative implementations.

In the following detailed description, reference is made to the accompanying drawings that form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

Figure 1A:
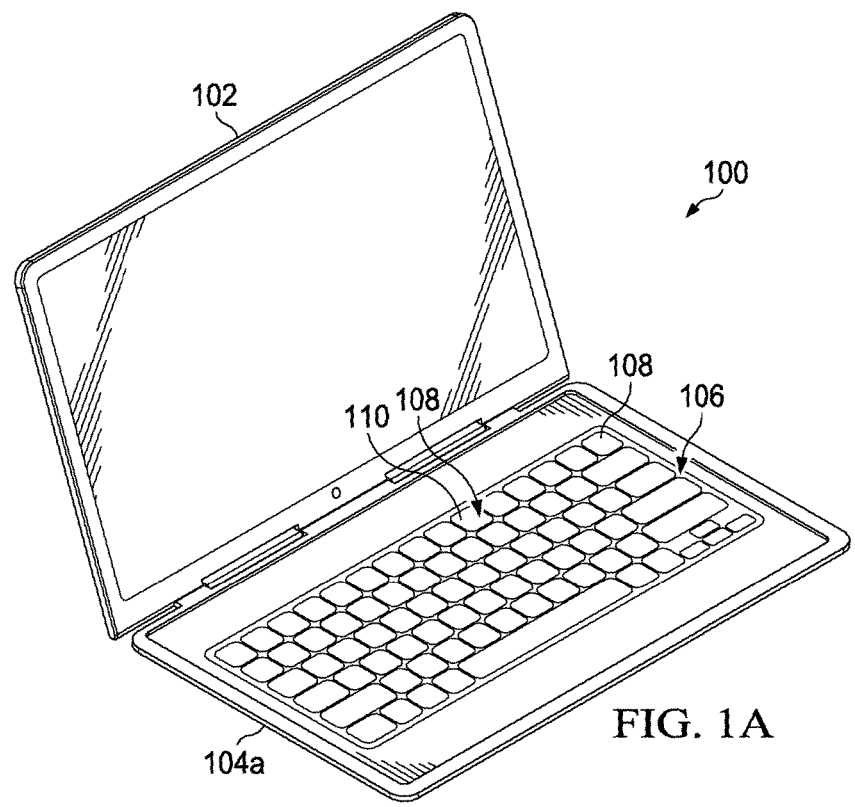
FIG. 1A is a simplified schematic diagram illustrating a perspective view of an embodiment of an electronic device, in accordance with the present disclosure.

FIG. 1A is a simplified schematic diagram illustrating an embodiment of an electronic device 100 in accordance with one embodiment of the present disclosure. Electronic device 100 can include a first housing 102 and a second housing 104a. First housing 102 can include a display and be rotatably coupled to second housing 104a. Second housing 104a can include a keyboard portion 106. Keyboard portion 106 can include a plurality of keys 108 and each key 108 can include a keycap 110. In one or more embodiments, electronic device 100 may be any suitable electronic device having a keyboard or keys such as a computer that includes keys, a desktop computer, a mobile device that includes keys, a tablet device that includes keys, a Phablet™ that includes keys, a personal digital assistant (PDA) that includes keys, an audio system that includes keys, a movie player of any type that includes keys, etc.

Figure 1B:
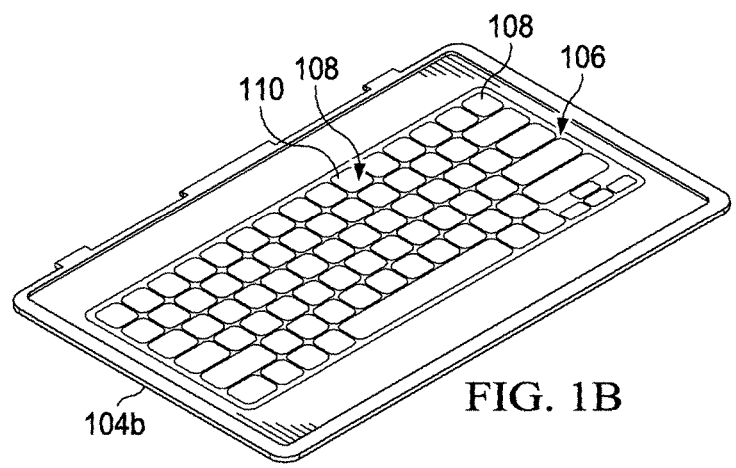
FIG. 1B is a simplified schematic diagram illustrating a perspective view of an embodiment of an electronic device, in accordance with the present disclosure.

Turning to FIG. 1B, FIG. 1B is a simplified schematic diagram of a detachable and/or standalone second housing 104b in accordance with one embodiment of the present disclosure. Second housing 104b can include keyboard portion 106 and plurality of keys 108. Each key 108 can include keycap 110. Second housing 104b may be a keyboard in communication with an electronic device (e.g., a standalone keyboard or Bluetooth™ keyboard in wireless communication with an electronic device, a desktop keyboard connected to a computer through a wire or cable) or may be physically attached to an electronic device (e.g. a keyboard integrated into the chassis of an electronic device).

For purposes of illustrating certain example features of a bi-stable, the following foundational information may be viewed as a basis from which the present disclosure may be properly explained. A tactile keyboard is mechanical keyboard where keys travel down when a user applies a force to press the keys and the keys strike back to their original position after the user applied force is released. Such keyboards are used for data input in a variety of applications such as laptops, desktop keyboards, industrial control systems, remote controls, automotive and many others etc. Tactile keyboards typically consist of different functional elements or blocks, such as a key, a dome, scissor, switch, and base plate. The dome can be a rubber, plastic, silicone, or metallic dome or any other similar element which is compressed and deforms when force is applied and rebounds back to its original shape and size when the applied force is removed. The scissor can be a scissor or any other similar element to lock the key and constrain its motion to only or primarily in the vertical direction. The switch is some form of switch which is closed when the key is pressed (to detect the input). The base plate can be a base plate or any other similar element which acts as a foundation for components of the keyboard.

A keycap of a keyboard is a small mechanical component which travels up and down when the key is pressed by a user. A typical keycap includes a fine curved surface on the top to provide ergonomic comfort when a finger of a user rests on the keycap. The typical keycap also includes a fine textured surface to prevent a glossy/shining finish and provide a subtle grip for the finger of the user when the finger presses the key. Some keycaps include a label (either printed or etched) on a topmost surface of the keycap to provide a wide angle of view (almost 180 degree) and allow identification of the key. In addition, the typical keycap can include a locking mechanism on the bottom side to provide a mechanical (usually a snap fit) connection with rest of the keyboard subsystem. The thickness of the keycap at a periphery and at the locking mechanism is usually around 2 millimeters (mm) while the thickness in other areas is often around 1 mm. Most keycaps are designed to withstand multi-million operations.

Keyboards have traditionally remained passive mechanical devices for gathering user input. The focus on keyboards has generally been on the mechanical aspects in making the keyboards thinner, quieter, with lower operating pressure, etc. The key is typically a passive component of the keyboard because there is no electrical connection available at the key. Some keys are customizable and have an electrical connection but the electrical connection using existing methods (e.g., wires, cables, or pogo pins) have serious limitations as there is typically not enough space for the electrical connection. For example, the typical dimension of a typical key cap is about 14 mm×13.5 mm×1.8 mm. The air gap between a bottom surface of the key and the base plate is typically an amount that allows for a key travel of about 1.2 mm to about 2.5 mm.

In addition, use of an interconnect cable or wire is difficult and infeasible from an assembly standpoint for high volume production. Also, the use of an interconnect cable or wire can interfere with other components when the key is in a vertical motion and can impact the operating pressure. For example, the operating pressure can increase and become inconsistent with the use of interconnected cables or wires and hence, impact the usability of key. Further, the use of an interconnect cable or wire is not reliable to withstand multi-million operations. Use of a wireless energy transfer solution is also expensive and increases power consumption.

In the past, an electrical contact to a key has been attempted by creating a customized electromechanical switch. However, the addition of new parts to make the electrical connection under each key increases the overall weight, is expensive, and can be complex to assemble. For example, many current keys include a dome/scissor assembly with 3-layer polyethylene terephthalate (PET) for a conductive membrane based switch and require only a simple snap fit assembly. An electro-mechanical based tactile switch often requires additional parts and a special tool for assembly. Further, the keys require diligent periodic maintenance or periodic cleaning of dust and can require periodic greasing to reduce the noise level of the keys as the additional mechanical parts seem to make the key vulnerable to noise if not regularly maintained.

As explained above, interactive keyboards in the past typically employ custom and sophisticated designs. They often utilize custom parts and connection mechanisms that add significant cost thereby limiting their usability. Interactive keys can also change the fundamental feel of using a keyboard thereby limiting their acceptance. For example, often interactive keys are typically bulkier, the display is at a visual depth from the surface of the key, the display has a limited viewing angle and brightness, the surface finish is not similar to conventional keys, the keys feel more "clicky" or do not have any tactile response, etc. In addition, current interactive keys often demand more maintenance from end users and consume a relatively high amount of power.

One way to create an interactive key is to include an active element in the keycap. However, because an acceptable electrical connection is not available at the key, the typical keycap does not contain an active element like a display or sensor. One reason for this is because given the thin mechanical profile, surface topology, viewing, and lifetime requirements of a key, it can be difficult to embed an active element inside a keycap without compromising use of the key.

Also, the current process to design and build displays in a keycap has multiple problems. One such problem associated with bi-stable displays is ghosting and can spoil or detract the user's experience and use of the keyboard. Bi-stable displays have display elements that can be switched between two or more stable states, which are sandwiched between a single top electrode and multiple bottom electrodes. Ghosting can occur when display elements in the insulation gap between adjacent bottom electrodes of a bi-stable display are left in an in-deterministic state after few cycles of state change.

One solution to mitigate ghosting in bi-stable displays is to periodically refresh the entire display. However, refreshing the entire display (as opposed to a portion of display) significantly degrades user experience and can increase the overall system power consumption. Another common problem is an aspect ratio mismatch where the aspect ratio of an outer dimension of a display is not same as the aspect ratio of an active display region. An aspect ratio mismatch can occur when the area required to make a connection from the base substrate to a top electrode is outside the active area. Further, the process to remove dielectric material (to enable electrical connection to the top electrode) is manual and can take a significant amount of time and require a relatively large area of removal. This causes a situation where the aspect ratio of the active area is not same as the aspect ratio of the outer dimension and can introduce constraints to the aesthetics as well as the mechanical and industrial design. Also, additional space (in the X and Y plane) is required which is not always available, especially on special or small displays.

Another possible issue is that the display cannot be made with a zero or near zero-millimeter (mm) bezel because the top electrode connection and edges (e.g., inactive protective edges to protect the dielectric from environmental elements, heat seal, etc.) add a margin around the display. An active area is the actual visible area of a display and a border is required to laminate all layers of the active element stack that includes the display with a heat seal or a similar process to prevent the dielectric from being exposed to moisture. In addition, design rule constraints can introduce issues or problems. For example, an insulation gap between adjacent bottom electrodes (segments) depends on the dielectric and the material used for the base substrate and the minimum spacing in the graphic artwork (created on the bottom electrode) is limited by the insulation gap.

The electrical interface of an interactive keyboard can also create problems as the connection to the bottom electrodes is often brought out through printed silver traces (or equivalent material). This causes the traces to extend outside the active area on the same horizontal plane of the base substrate to form a tail. If the display driver printed circuit board (PCB) is directly underneath the display, then an additional area (in the X and Y plane) to allow for a bending radius for the tail is required.

Key 108 can be configured to change a traditional keyboard from a passive device to an intelligent, interactive device while at the same time overcoming some of the above issues. In an embodiment, keyboard portion 106 and key 108 can utilize the elements or components of existing keyboards with few modifications and no significant impact to usability, productivity, feel, or reliability as compared to traditional keyboards. Keyboard portion 106 and key 108 can have relatively minimal cost addition and minimal impact to assembly as compared to traditional keyboards. Further, keyboard portion 106 and key 108 can have little or no added maintenance and relatively low additional power consumption as compared to a traditional keyboard. As some of the same elements or components are used as a regular mechanical keyboard, there can be co-existence of traditional keys and active keys within the same system. For example, one row in keyboard portion 106 can include key 108 and be active while the rest of the keyboard can include traditional mechanical keys.

In addition, keyboard portion 106 can be configured to provide an interactive keyboard that provides an interactive and contextual experience without compromising on the feel, function, or reliability of traditional keyboards. The basic elements of a traditional mechanical keyboard like keycap, silicone dome, scissor, base plate, scan matrix are all retained with modifications to certain elements. In an example, key 108 can include an embedded segmented bi-stable e-paper display that can change state interactively based on user input or contextually based on the content or application displayed on a screen linked to keyboard portion 106.

Keyboard portion 106 can be configured to use existing keyboard components and similar assembly methods. In addition, keyboard portion 106 does not impact or only slightly impacts the feel or function of traditional keyboards and can be implemented even within small Z-height keycaps. Further, when compared to traditional keys, existing ergonomic layout considerations like pitch and spacing can remain virtually unaffected, operating force or travel of key 108 can be relatively unaffected, texture and curvature for ergonomics of key 108 can be maintained, and significant height or weight of key 108 is not added. Also, existing form factors can be retained and an interactive component such as a display can appear to be at the typing surface of key 108 similar to traditional keyboards to provide an almost 180 degree viewing angle. In addition, keyboard portion 106 can be configured for reliable operation for multimillion cycles as in traditional keyboards and have no additional maintenance or cleaning required. Using a bi-stable reflective display allows the keyboard to be daylight readable. Further, relatively low power is consumed by key 108 as state is retained even after the power is removed (power is consumed only during state change). This and other factors allow for a relatively minimal cost addition to implement keyboard portion 106.

In addition, an active element such as a display as outlined herein can resolve the active keycap issues (and others) mentioned above. In an example, the display can be configured to print or integrate a colored mask on an outer most surface or user facing side of a display in a keycap. In an example, two artworks may be prepared. The two artworks can include a coarse artwork for the bottom electrodes on the base substrate and a fine artwork for the mask or top layer. The fine artwork can be unconstrained by design rules of an underlying dielectric layer. A matte or glossy overcoat may be used to create uniform surface texture such that there is no mismatch between the surface texture of exposed areas and the mask printed area. The dielectric may be removed from the active area to enable connection to the top electrode from the base substrate. In an example, a laser ablation may be used for dielectric removal. With laser ablation, the removal process can be made relatively quickly and the dimensions of the dielectric removal area can be made significantly smaller as compared to some other processes. In an example, the dielectric removal area can be made small enough to not be noticed or perceived by the naked eye of a typical user. Where a large area is required and the area is noticeable, the area can be covered with the mask.

The display can be configured to reduce or eliminate visible ghosting and reduce power consumption as a global refresh is not required. With coarse artwork for the bottom electrodes and fine artwork on top of the display, the area which is undergoing a ghosting effect can be hidden. The ghosting effect is present, but it is not visible to the user because the mask can cover or hide the area where the ghosting would occur. In addition, the display can allow for finer graphics because visible artwork is not dependent on design rules of the dielectric layer. The display can also allow for a uniform aspect ratio of an active area and an outer dimension if the display is laminated or allow for a zero-millimeter bezel if the display is not laminated where the top electrode takes a small portion of the active area as opposed to taking up an entire edge. Also, the number of drive lines can be reduced by one because a background segment is not required with a mask. Reducing the drive lines by one can be an advantage in tight space constraints. The display can further be configured to avoid the requirements of a display tail and the area required for its bending radius. This can be an advantage when the display is used in very small applications such as a wearable or a keycap of a keyboard.

In an example, a user facing side of the display can be printed with a mask layer. The graphic on the mask can be very fine and independent of the design rules applicable on a bottom electrodes or base substrate. The mask is a static region that does not change and can serve as the background and has the same or similar color as the background segment (if present). The mask may have a matte or glossy finish to match the look and feel of a traditional keycap. The area that is left exposed by the mask can be coated with a transparent overcoat. The thickness of the overcoat can have the same or relatively the same thickness as the thickness of mask ink. The finish of a transparent overcoat (glossy or matte) is kept the same as the finish of ink used for printing the mask.

The display can include a coarse graphic printed as bottom electrodes on the base substrate. If the background color is black, then a character printed on the mask is made visible by driving the corresponding bottom electrode appropriately such that the display elements in that region are driven to a white state. Similarly, the character printed with a mask can be driven to a hidden state by driving the corresponding bottom electrode appropriately such that the display elements in that region are driven to a black state or the same color as the mask. The pattern created by the bottom electrodes can be used similar to a backlight. The bottom electrodes define broad regions that can be turned on or off electrically while the top mask defines specific images (e.g., image, symbol, letter, number, etc.) over these regions. The thickness and finish match of the transparent overcoat applied on the exposed area can be the same as the thickness and finish of the ink used for the mask. The color used for mask can be the same as the effective color of a background segment as seen through the overcoat. This ensures that a hidden state can be effectively achieved as the color of the dielectric can match or blend into the color of the mask.

For connecting the top electrode, the dielectric can be removed from the active area itself. The dead region created by the removal of the dielectric can be hidden by the mask. Since the dielectric removal can be performed by laser ablation, the size of the dead region is limited to a relatively small dimension to minimize the loss of a display region within the active area. The insulation gap between adjacent bottom electrodes can also be hidden by the mask. As a result, the ghosting effect is never visible to a user during ordinary use. The base substrate (e.g., PET, FR4, or polyimide) can include conductive vias to couple the bottom electrode connection to pads or top electrode coupling areas on the bottom side of the base substrate. The electrical connection to these pads or top electrode coupling area can be established to a PCB or other means of electrical connection using a Z-axis conductive adhesive or other mechanisms like a metal ball. In an example, a plurality of conductive regions can be on a backplane. The backplane may be carbon printed on a base substrate backplane connected to keycap electrical connections through a Z-axis conductive adhesive.

The bi-stable display can include two parts, a front plane that includes a top electrode and a dielectric and a base substrate that includes a bottom electrode. The bottom electrode can define a broad region of backlight. In an example, keycap 110 can include one or more front plane elements. Each front plane element can be about the size of an image (e.g., image, symbol, letter, number, etc.) to be displayed on keycap 110. This reduces the consumption of front plane material and reduces the overall cost of manufacturing the front plane. The front plane elements do not need to be over all or even a majority of keycap 110 and can be limited to the areas where a display graphic (or element) is necessary or desired to be displayed on keycap 110. Each front plane element has its own top plane. The process used for the creation of each top plane element can be configured to enable an electrical connection that has a relatively small foot print. In an example, a top electrode connection of each of the front planes can be connected together and coupled to a single top electrode node from the system.

In one or more embodiments, keycap 110 can be included in a device that may include a battery and various components of an electronic system. The components may include a central processing unit (CPU), a memory, etc. Any processors (inclusive of digital signal processors, microprocessors, supporting chipsets, etc.), memory elements, etc. can be suitably coupled to a motherboard based on particular configuration needs, processing demands, computer designs, etc. Other components such as external storage, controllers for video display, sound, and peripheral devices may be attached to the motherboard as plug-in cards, via cables, or integrated into the motherboard itself.

Figure 2:
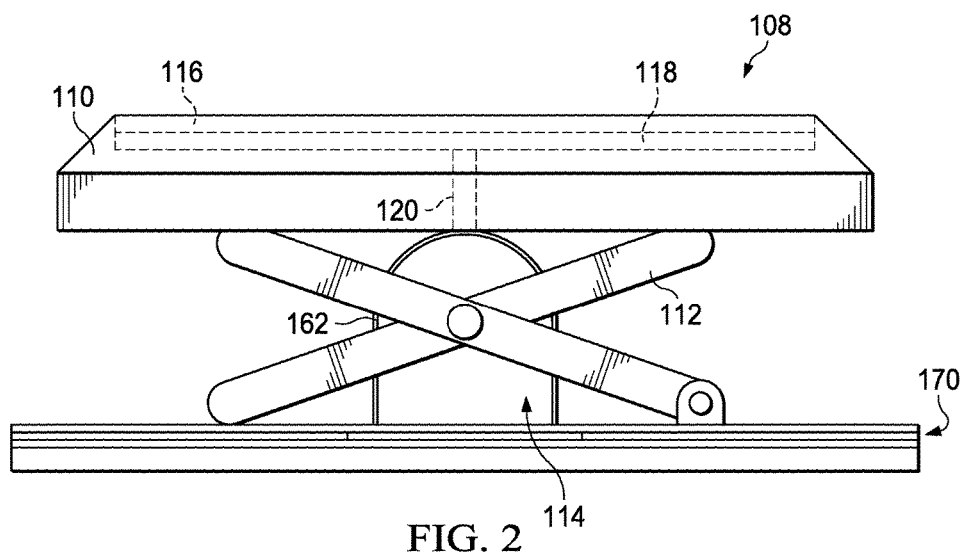
FIG. 2 is a simplified schematic diagram illustrating a plan view of an embodiment of a portion of a keyboard, in accordance with the present disclosure.

Turning to FIG. 2, FIG. 2 is a cross section side view of key 108, in accordance with one embodiment of the present disclosure. Key 108 can include keycap 110, scissors 112, and a dome 114. Keycap 110 can include a resin layer 116 and an active element 118. Dome 114 can be configured to cause a corresponding switch in a scan matrix layer 170 to close during key presses. Conductive layer 162 can be conductive layer coupled to dome 114 to allow dome 114 to be conductive without affecting its mechanical function.

Key 108 does not require a new electro-mechanical switch design and reuses existing elements of a keyboard which are proven over several decades and are broadly available. Hence there is no interference with the corresponding switch. Further, the system does not add new assembly steps for the interconnection of the elements. An electrical connection can be established using existing processes of a keyboard assembly and does not impact the operating pressure of keyboard. Also, key 108 does not require any additional periodic maintenance, disassembly, cleaning, reassembly, and verification (or no more than a typical mechanical keyboard assembly) or require nominal cleaning. The system can provide reliable electrical and mechanical functionality over multi-million operations with no additional maintenance. Key 108 is relatively inexpensive, relatively light, and there is no deviation or relatively minor deviation from to the shape and size of a traditional key.

During use, dome 114 can include silicone, metallic, or any other equivalent element that can absorb the operating pressure when key 108 is pressed and then strike back key 108 to its original position when the operating pressure is removed. Dome 114 can maintain consistent contact with a bottom side of key 108 at a top end of dome 114 and a bottom structural foundation of a keyboard module at a bottom end of dome 114 to facilitate smooth tactile motion. This contact can be used to establish an electrical connection between keycap 110 and the rest of the system that includes key 108. The surface or structure of dome 114 can be modified or used to include multiple electrical paths, including but not limited to electrical path 120 and is not limited to the illustrations, embodiments, or designs discussed herein.

Figure 3:
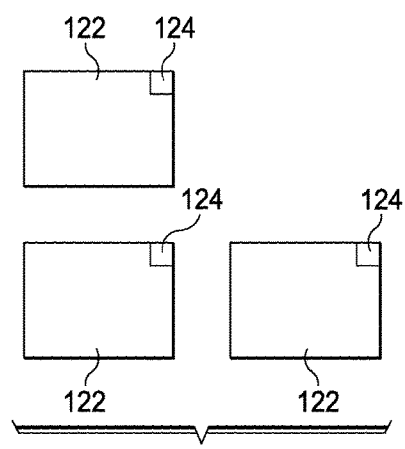
FIG. 3 is a simplified block diagram illustrating an embodiment of a portion of a bi-stable display, in accordance with the present disclosure.

Turning to FIG. 3, FIG. 3 illustrates multiple front plane elements 122. Each front plane element 122 can include a front plane top electrode connection 124. Front plane element 122 may be electronic ink or e-ink. Each front plane element 122 can be positioned over a conductive region on a back plane.

Figure 4:
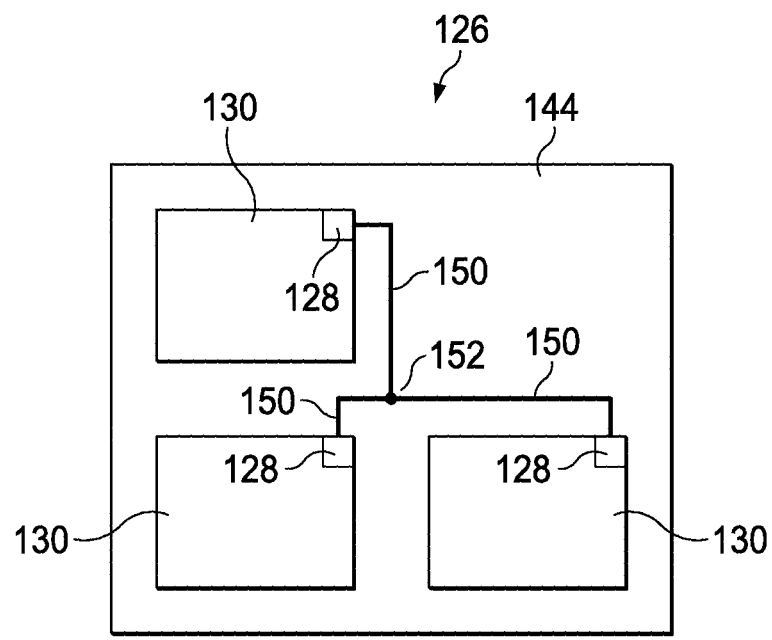
FIG. 4 is a simplified block diagram illustrating an embodiment of a portion of a bi-stable display, in accordance with the present disclosure.

Turning to FIG. 4, FIG. 4 illustrates a back plane 126. Back plane 126 can include a common top electrode connection 152 and a plurality of conductive regions 130 on a base substrate 144. Top electrode connection 152 can connect each top electrode coupling area 128 to a common node. In an example, base substrate 144 may be a backplane and each of the conductive regions 130 can be coupled to base substrate 144 using a Z-axis conductive adhesive. Each of the plurality of conductive regions 130 can include a top electrode coupling area 128. Each top electrode coupling area 128 in conductive regions 130 can be connected to common top electrode connection 152 using conductive paths 150. Back plane 126 can be a PET sheet with printed carbon traces. In an example, conductive paths on back plane 126 can be brought to pads (e.g., top electrode coupling areas) on the other side (keycap side) using conductive vias. These pads can come in contact with a PCB built in keycap 110 using a Z-axis conductive adhesive. In another example, the conductive pads on the other side of back plane 126 can come in contact with one or more conductive pads integrated in the structure of keycap 110 that have been created using a laser catalyzer plating (LCP) process and Z-axis conductive adhesive. In yet another example, front plane elements 122, can be directly integrated on conductive regions on keycap 110 created using an LCP process. In such a design, multiple pieces of front plane elements 122 (illustrated in FIG. 3) may be directly attached to a body (e.g., a plastic body) of keycap 110. The active elements in keycap 110 can be driven by conductive pads and traces that are built into the structure of keycap 110 using an LCP process. This allows integration of display functionality in a thinner space by completely avoiding the PET layer of back plane 126.

Figure 5:
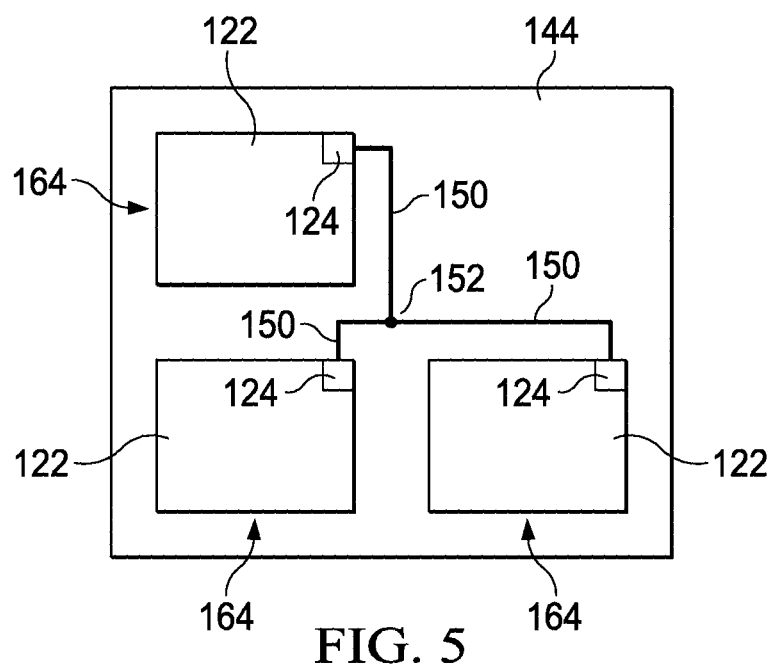
FIG. 5 is a simplified block diagram illustrating an embodiment of a bi-stable display, in accordance with-the present disclosure.

Turning to FIG. 5, FIG. 5 illustrates front plane elements 122 illustrated in FIG. 3 over back plane 126 illustrated in FIG. 4. Front plane elements 122 can be orientated over each conductive region 130 to create multiple bi-stable displays 164. Also, each front plane top electrode connection 124 can align with a respective top electrode coupling area 128 and couple with common top electrode connection 152 such that each front plane top electrode connection 124 is connected through conductive paths 150. The areas where front plane elements 122 are over a conductive region 130 are the areas where an image, symbol, letter, number, etc. will appear in or on keycap 110. By having the front plane broken up into multiple front plane elements 122 (instead of over the entire back plane 126 or base substrate 144) the use of relatively expensive front plane material can be reduced and a reduction in overall cost of keycap 110 be achieved. Also, the process of creating a keycap with a bi-stable display can be relatively easy to scale and a front plane design can be reused or used on keycaps of different dimensions and specifications. For example, the size of back plane 126 can be virtually irrelevant as front plane elements 122 will be used only where an image, symbol, letter, number, etc. is desired to be shown on keycap 110.

Figure 6:
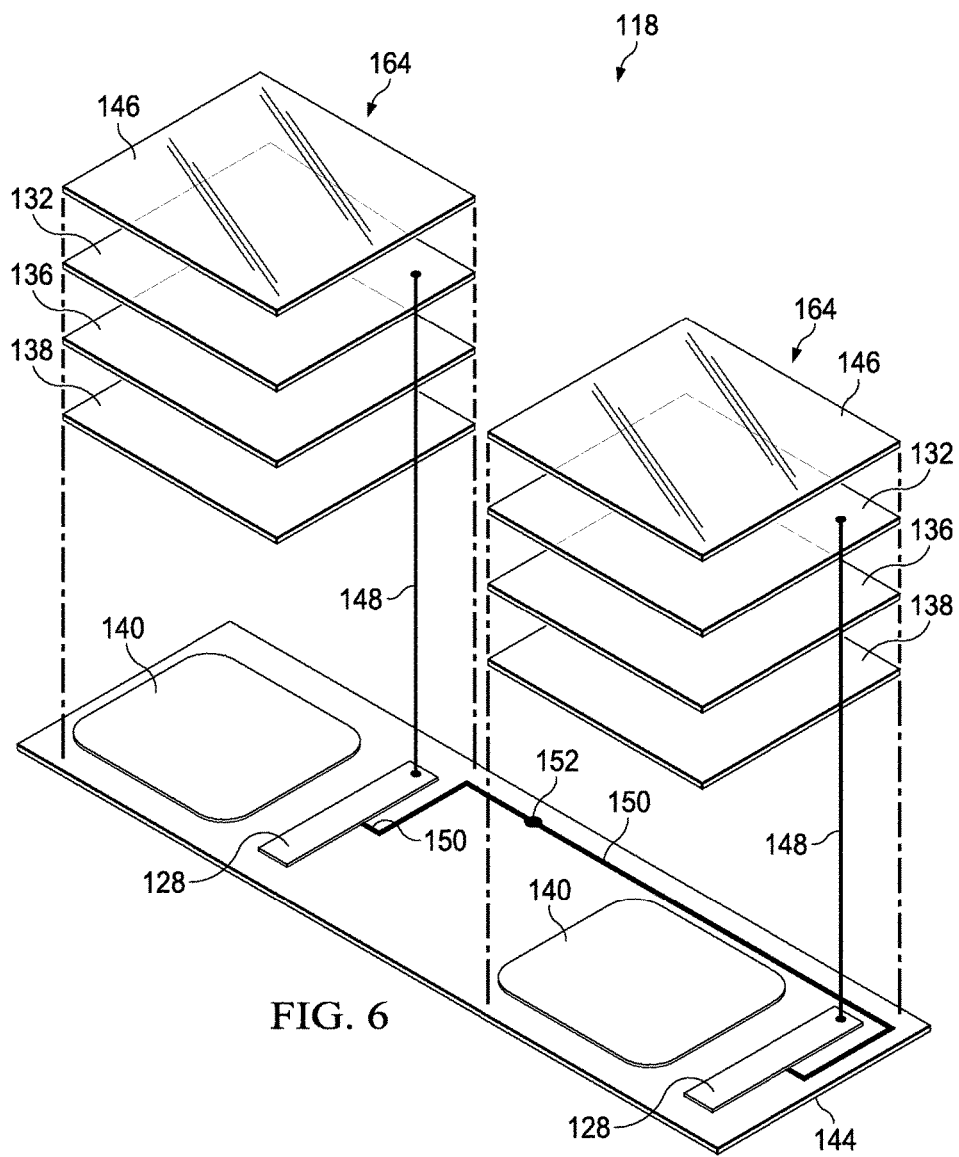
FIG. 6 is a simplified schematic diagram illustrating an exploded view of an embodiment of a bi-stable display, in accordance with the present disclosure.

Turning to FIG. 6, FIG. 6 is a simplified exploded view illustrating an embodiment of a portion of active element 118 in accordance with one embodiment of the present disclosure. Base substrate 144 can include a bottom electrode 140, top electrode coupling area 128, conductive paths 150, and common top electrode connection 152. Each top electrode coupling area 128 is coupled to a top electrode 132 using electrical path 148.

Top electrode 132 may be a top electrode facing a user side and can include transparent conductive material like Indium Tin Oxide (ITO). Top electrode 132 can be over a dielectric 136. The color of dielectric 136, as seen from the user facing side, can change when a differential voltage is applied across top electrode 132 and bottom electrode 140. In an example, the differential voltage is created by controlling the voltage of bottom electrode 140.

Figure 7:
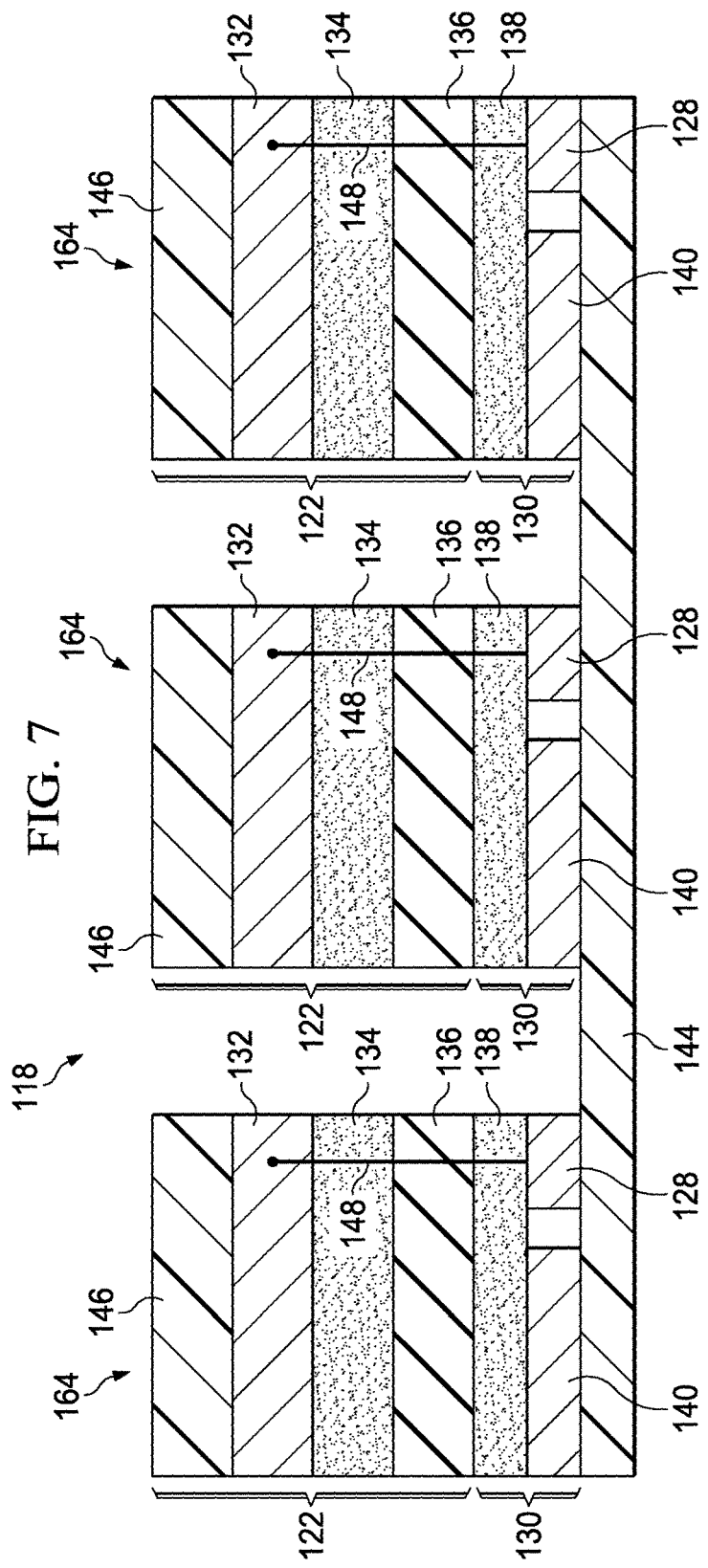
FIG. 7 is a simplified block diagram illustrating a cut away view of an embodiment of a bi-stable display, in accordance with the present disclosure.

Turning to FIG. 7, FIG. 7 illustrates one example of active element 118, in accordance with one embodiment of the present disclosure. Active element 118 can include one or more bi-stable displays 164 as illustrated in FIGS. 5 and 6. Each bi-stable display 164 can include front plane elements 122 and a conductive region 130. The term bi-stable refers to the ability of a display to retain content on the display even after the source of power for the display is removed. There are different types of bi-stable display, such as electrophoretic displays (eInk), electrochromic displays, and photonic displays. The displays differ based on the material used for dielectric 136 and each type can be included in or as part of active element 118. Each top electrode 132 can be under a top substrate 146. Top substrate 146 may be a protective transparent, semi-transparent, tinted, opaque, etc. layer. Bottom electrode 140 can be coupled to dielectric 136 using bottom conductive adhesive 138.

Each front plane element 122 can be covered by top substrate 146 and can include a top electrode 132, a top conductive adhesive 134, and a dielectric 136. Top electrode 132 can be coupled to dielectric 136 using top conductive adhesive 134. Top electrode 132 and top conductive adhesive 134 may be transparent, semi-transparent, tinted, opaque, etc.

Each conductive region 130 can include bottom conductive adhesive 138, a bottom electrode 140, and top electrode coupling area 128. Bottom electrode 140 can be coupled to dielectric 136 using bottom conductive adhesive 138. In addition, bottom electrode 140 can be electrically coupled to base substrate 144 such that the voltage of each bottom electrode 140 can be independently controlled and therefore, the voltage differential between each top electrode 132 and corresponding bottom electrode 140 can be independently changed.

Top electrode coupling area 128 can allow for an electrical connection between top electrode 132 and base substrate 144. More specifically, electrical path 148 can provide an electrical connection between top electrode 132 and top electrode coupling area 128 on base substrate 144. Dielectric 136 can be a bi-stable dielectric and when a voltage differential is created between top electrode 132 and bottom electrode 140 (e.g., using base substrate 144, the voltage for a specific bottom electrode 140 can be changed independently of other bottom electrodes), dielectric 136 can change from one state to another state. For example, dielectric 136 may change from a clear, neutral, or white color to an unclear, dark, or black color. In an example, a thickness of top electrode 132, dielectric 136, and bottom electrode 140 is less than about three (3) millimeters. Bottom conductive adhesive 138 may be a Z-axis conductive adhesive that helps to establish an electrical connection to base substrate 144 and a PCB. In an example, base substrate 144 may be a backplane and each of the conductive regions 130 can be coupled to base substrate 144 using a Z-axis conductive adhesive. The backplane may be carbon printed and connected to keycap electrical connections through bottom conductive adhesive 138.

Figure 8:
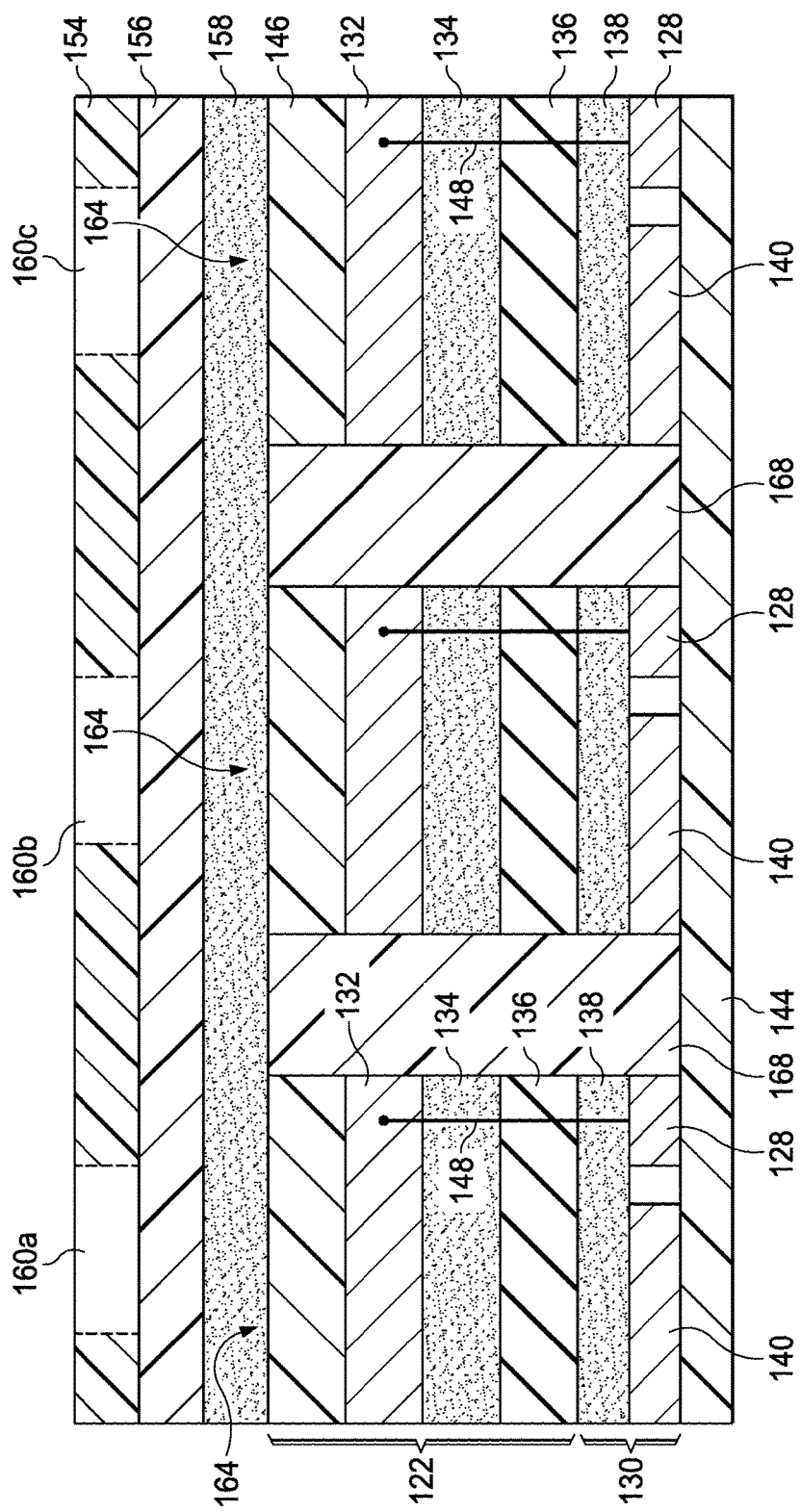
FIG. 8 is a simplified block diagram illustrating a cut away view of an embodiment of a bi-stable display, in accordance with the present disclosure.

Turning to FIG. 8, FIG. 8 illustrates one example of active element 118, in accordance with one embodiment of the present disclosure. As illustrated in FIG. 8, a filler 168 can be between each bi-stable display 164. In addition, a mask 154, a transparent substrate 156, and an adhesive 158 can be over each multiple-bi stable display 164 and filler 168. Filler 168 can be cured resin, PET film, or some other similar material. Filler 168 can help create a flat surface for multiple front plane design and help to insulate a bi-stable display from an adjacent bi-stable display. Adhesive 158 can be an optically clear adhesive and help to secure transparent substrate 156 to each bi-stable display 164.

Mask 154 can include a plurality of exposed areas 160*a*-160*c* where each exposed area 160*a*-160*c* is over one of the plurality of bi-stable displays 164. Each exposed area 160*a*-160*c* can be a different image, symbol, letter, number, etc. Mask 154 can be the same or a similar color as the color of dielectric 136 when dielectric 136 is in one of the bi-stable states. For example, if dielectric 136 is black in one of its bi-stable states, then mask 154 can also be black and the exposed area will not be visible or will be blended into mask 154 as illustrated in FIG. 9B. When dielectric 136 is in the other bi-stable state and a different color (e.g., white), dielectric 136 will not be the same color of mask and will be visible through the exposed area, as illustrated in FIG. 9A.

Figure 9A:
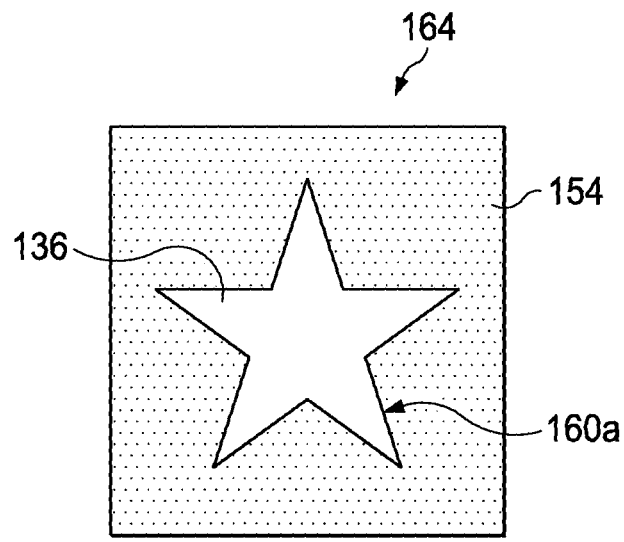
FIG. 9A is a simplified block diagram illustrating an embodiment of a portion of a bi-stable display, in accordance with the present disclosure.
Figure 9B:
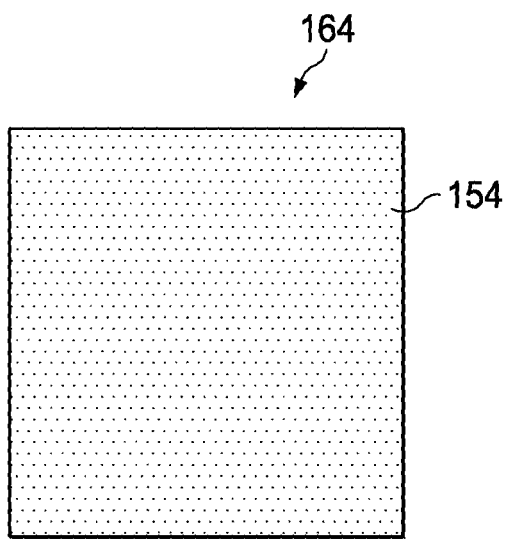
FIG. 9B is a simplified block diagram illustrating an embodiment of a portion of a bi-stable display, in accordance with the present disclosure.

Turning to FIG. 9A, FIG. 9A illustrates a block diagram view of an embodiment of bi-stable display 164 in one of its bi-stable states, in accordance with one embodiment of the present disclosure. FIG. 9A illustrates an example of when dielectric 136 is not the same or not close to the same color as mask 154 when a user is viewing keycap 110. In this example, when bi-stable display 164 is viewed, the user sees exposed area 160a or an image as in FIG. 9A. In FIG. 9A, because dielectric 136 is not the same color as mask 154, exposed area 160a is visible to a user.

Turning to FIG. 9B, FIG. 9B illustrates a block diagram view of an embodiment of bi-stable display 164 in one of its bi-stable states, in accordance with one embodiment of the present disclosure. FIG. 9B illustrates an example of when dielectric 136 is the same or close to the same color as mask 154 when a user is viewing keycap 110. In this example, when bi-stable display 164 is viewed, the user does not see the image illustrated FIG. 9A. In FIG. 9B, because dielectric 136 is the same or is close to the same color as mask 154, exposed area 160a is not visible to a user. By having a mask that includes a plurality of exposed areas to allow for selective visibility of dielectric 136 and allowing a color of a specific dielectric 136 to change when a differential voltage is applied between a corresponding top electrode 132 and bottom electrode 140, a specific exposed area (e.g., exposed area 160a) of mask 154 can be visible to a user when the specific dielectric 136 is one color, as illustrated in FIG. 9A, and then the specific exposed area can be blended into mask 154 when the specific dielectric 136 is the same or a similar color as mask 154, as illustrated in FIG. 9B.

Note that each bi-stable display 164 can be independently controlled such that one, two, and/or three images, symbols, letters, numbers, etc. can be displayed to a user. For example, exposed area 160a can represent a shape (e.g., the star illustrated in FIG. 9A), exposed area 160b can represent a number (e.g., the number "3"), and exposed area 160c can represent a letter (e.g., the letter "J"). If the symbol represented by exposed area 160a, the number represented by exposed area 160b, and the letter represented by exposed area 160c are not visible, dielectric 136 under exposed area 160a can change states independent of dielectric 136 under exposed areas 160b and 160c such that the shape represented by exposed area 160a is visible (similar to FIG. 9A), while the number represented by exposed area 160b and the letter represented by exposed area 160c are not visible (similar to FIG. 9B). If the symbol represented by exposed area 160a is visible and the number represented by exposed area 160b and the letter represented by exposed area 160c are not visible, then dielectric 136 under exposed area 160a and dielectric 136 under exposed area 160b can change states such that the number represented by exposed area 160b is visible, while the shape represented by exposed area 160a and the letter represented by exposed area 160c are not visible. If the number represented by exposed area 160b is visible and the symbol represented by exposed area 160a and the letter represented by exposed area 160c are not visible, then dielectric 136 under exposed areas 160a-160c can each change states such that both the shape represented by exposed area 160a and the letter represented by exposed area 160c are visible while the number represented by exposed area 160b is not visible.

Active element 118 may be used with any suitable electronic device having a display such as a computer, mobile device, a tablet device (e.g., i-Pad™), Phablet™, a personal digital assistant (PDA), a smartphone, an audio system, a movie player of any type, etc. In an example, a key (e.g., key 108) that includes active element 118 can be coupled to a transmitter sheet. The transmitter sheet can allow signals and communications to be be communicated between active element 118 and a transmitter board and in turn to a controller board. The transmitter board can be configured to control active element 118 and independently control each bi-stable display 164 in keycap 110. The controller board can be configured to control or send communications to the transmitter board. In an example, the controller board can include logic or instructions that can be communicated to the transmitter board and the transmitter board can function as a driver to cause active element 118 to perform a function or action. A host interface can be configured to communicate with various electronics such as a main motherboard.

In an example, dielectric 136 is sandwiched between top electrode 132 (a first conductor) and bottom electrode 140 (a second conductor). When a differential voltage is created between top electrode 132 and bottom electrode 140, the differential voltage can be used to change the state of dielectric 136 and cause dielectric 136 to produce a different color. In one example, a first differential voltage can cause dielectric 136 to appear white such that exposed area 160a appears white or a contrasting color to the color of the mask 154 (e.g., as illustrated in FIG. 9A). When a second differential voltage is applied across top electrode 132 and bottom electrode 140, the color of dielectric 136 changes to appear black or to match the color of mask 154 and exposed area 160a may not be visible to the user and the user would not see any visible indication or very little indication or trace of exposed area 160a (e.g., as illustrated in FIG. 9B). Note that the color of dielectric 136 may include colors other than black and a solid color may be used or two or more different colors may be used.

It is imperative to note that all of the specifications, dimensions, and relationships outlined herein (e.g., height, width, length, materials, etc.) have only been offered for purposes of example and teaching only. Each of these may be varied considerably without departing from the spirit of the present disclosure, or the scope of the appended claims. The specifications apply only to one non-limiting example and, accordingly, they should be construed as such. In the foregoing description, example embodiments have been described. Various modifications and changes may be made to such embodiments without departing from the scope of the appended claims. The description and drawings are, accordingly, to be regarded in an illustrative rather than a restrictive sense.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Other Notes and Examples

Example A1 is an active element in a keycap on a key of a keyboard, the active element including a plurality of front plane elements, where each front plane element includes a top electrode, a conductive region under each of the plurality of front plane elements, where each conductive region includes a bottom electrode and a top electrode coupling area, where each top electrode coupling area is electrically coupled to a common top electrode node, an electrical path between each top electrode and each corresponding top electrode coupling area such that each top electrode is connected to the common top electrode node, and a dielectric between each top electrode and each bottom electrode.

In Example A2, the subject matter of Example A1 may optionally include where a color of the dielectric between a specific top electrode and a corresponding bottom electrode changes when a differential voltage is applied between the specific top electrode and the corresponding bottom electrode.

In Example A3, the subject matter of any of the preceding 'A' Examples can optionally include a mask over the front plane elements, wherein the mask includes a plurality of exposed areas to allow for selective visibility of the dielectric.

In Example A4, the subject matter of any of the preceding 'A' Examples can optionally include where each of the plurality of exposed areas can be an image, symbol, letter, or number.

In Example A5, the subject matter of any of the preceding 'A' Examples can optionally include where the differential voltage between the specific top electrode and the corresponding bottom electrode is created by changing a voltage associated with the corresponding bottom electrode independent of voltage associated with other bottom electrodes.

In Example A6, the subject matter of any of the preceding 'A' Examples can optionally include where each of the plurality of conductive regions and each of the top electrode coupling areas are formed directly on the keycap.

In Example A7, the subject matter of any of the preceding 'A' Examples can optionally include where the plurality of conductive regions are on a backplane.

In Example A8, the subject matter of any of the preceding 'A' Examples can optionally include where the keycap is less than six (6) millimeters in height.

In Example A9, the subject matter of any of the preceding 'A' Examples can optionally include where a thickness of the top electrode, the dielectric, and the bottom electrode is less than about three (3) millimeters.

Example AA1 is a keyboard that includes a plurality of keys, where at least one of the keys includes a keycap. The keycap can include a plurality of front plane elements, where each front plane element includes a top electrode, a plurality of conductive regions on a back plane under each of the plurality of front plane elements, where each conductive region includes a bottom electrode and a top electrode coupling area, where each top electrode coupling area is electrically coupled to a common top electrode node, an electrical path between each top electrode and a corresponding top electrode coupling area such that each top electrode is connected through conductive paths to the common top electrode node to allow for a selective creation of a differential voltage between each top electrode and each bottom electrode, and a dielectric between each top electrode and each bottom electrode.

In Example AA2, the subject matter of Example AA1 may optionally include where a color of the dielectric between a corresponding top electrode and a corresponding bottom electrode changes when a differential voltage is applied between the corresponding top electrode and the corresponding bottom electrode.

In Example AA3, the subject matter of any of the preceding 'AA' Examples can optionally include a mask over the front plane elements, wherein the mask includes a plurality of exposed areas to allow for selective visibility of the dielectric.

In Example AA4, the subject matter of any of the preceding 'AA' Examples can optionally include where each of the plurality of exposed areas can be image, symbol, letter, or number.

In Example AA5, the subject matter of any of the preceding 'AA' Examples can optionally include where a thickness of the top electrode, the dielectric, and the bottom electrode is less than about three (3) millimeters.

In Example AA6, the subject matter of any of the preceding 'AA' Examples can optionally include where the keycap is less than six (6) millimeters in height.

Example M1 is a method that includes creating a keycap for a key on a keyboard, the keycap including a plurality of front plane elements, where each front plane element includes a top electrode, a plurality of conductive regions on a backplane under each of the plurality of front plane elements, where each conductive region includes a bottom electrode and a top electrode coupling area, where each top electrode coupling area is electrically coupled to a common top electrode node, an electrical path between each top electrode and a corresponding top electrode coupling area such that each top electrode is connected through conductive paths to the common top electrode node to allow for a selective creation of a differential voltage between each top electrode and each bottom electrode, and a dielectric between each top electrode and each bottom electrode.

In Example M2, the subject matter of any of the preceding 'M' Examples can optionally include where a color of the dielectric between a corresponding top electrode and a corresponding bottom electrode changes when a differential voltage is applied between the corresponding top electrode and the corresponding bottom electrode.

In Example M3, the subject matter of any of the preceding 'M' Examples can optionally include where the keycap further includes a mask over the front plane elements, wherein the mask includes a plurality of exposed areas to allow for selective visibility of the dielectric.

In Example M4, the subject matter of any of the preceding 'M' Examples can optionally include where each of the plurality of exposed areas can be an image, symbol, letter, or number.

In Example M4, the subject matter of any of the preceding 'M' Examples can optionally include where the keycap is less than six (6) millimeters in height.

An example system S1 can include a processor, memory, a first housing, where the first housing includes a display, a second housing, where the second housing includes a keyboard, where the keyboard includes a plurality of keys and at least a portion of the plurality of keys includes a keycap. The keycap can include a plurality of front plane elements, where each front plane element includes a top electrode, a plurality of conductive regions under each of the plurality of front plane elements, where each conductive region includes a bottom electrode and a top electrode coupling area, where each top electrode coupling area is electrically coupled to a common top electrode node, an electrical path between each top electrode and a corresponding top electrode coupling area such that each top electrode is connected through conductive paths to the common top electrode node to allow for a selective creation of a differential voltage between each top electrode and each bottom electrode, and a dielectric between each top electrode and each bottom electrode.

An example system S2 can include where a color of the dielectric between a corresponding top electrode and a corresponding bottom electrode changes when a differential voltage is applied between the corresponding top electrode and the corresponding bottom electrode.

In Example S3, the subject matter of any of the preceding 'SS' Examples can optionally include a mask over the front plane elements, wherein the mask includes a plurality of exposed areas to allow for selective visibility of the dielectric.

In Example S4, the subject matter of any of the preceding 'SS' Examples can optionally include where each of the plurality of exposed areas can be an image, symbol, letter, or number.

In Example S5, the subject matter of any of the preceding 'SS' Examples can optionally include where a thickness of the top electrode, the dielectric, and the bottom electrode is less than about three (3) millimeters.

In Example S6, the subject matter of any of the preceding 'SS' Examples can optionally include where the keycap is less than six (6) millimeters in height.

What is claimed is:

1. An active element in a keycap on a key of a keyboard, the active element comprising:
   a plurality of front plane elements, wherein each front plane element includes a top electrode;
   a conductive region under each of the plurality of front plane elements, wherein each conductive region includes a bottom electrode and a top electrode coupling area, wherein each top electrode coupling area is electrically coupled to a common top electrode connection;
   an electrical path between each top electrode and each corresponding top electrode coupling area such that each top electrode is connected to the common top electrode connection; and
   a dielectric between each top electrode and each bottom electrode.

2. The active element of claim 1, wherein each of the conductive regions and each of the top electrode coupling areas are formed directly on the keycap.

3. The active element of claim 1, wherein the conductive regions are on a backplane.

4. The active element of claim 1, wherein the keycap is less than six (6) millimeters in height.

5. The active element of claim 1, wherein a color of the dielectric between a specific top electrode and a corresponding bottom electrode changes when a differential voltage is applied between the specific top electrode and the corresponding bottom electrode.

6. The active element of claim 5, wherein the differential voltage between the specific top electrode and the corresponding bottom electrode is created by changing a voltage associated with the corresponding bottom electrode independent of voltage associated with other bottom electrodes.

7. The active element of claim 5, further comprising:
   a mask over the front plane elements, wherein the mask includes a plurality of exposed areas to allow for selective visibility of the dielectric.

8. The active element of claim 7, wherein each of the plurality of exposed areas can be an image, symbol, letter, or number.

9. A keyboard comprising:
   a plurality of keys, wherein at least one of the keys includes a keycap and the keycap includes:
      a plurality of front plane elements, wherein each front plane element includes a top electrode;
      a conductive region under each of the plurality of front plane elements, wherein each conductive region includes a bottom electrode and a top electrode coupling area, wherein each top electrode coupling area is electrically coupled to a common top electrode connection;
      an electrical path between each top electrode and each corresponding top electrode coupling area such that each top electrode is connected to the common top electrode connection; and
      a dielectric between each top electrode and each bottom electrode.

10. The keyboard of claim 9, wherein a thickness of the top electrode, the dielectric, and the bottom electrode is less than about three (3) millimeters.

11. The keyboard of claim 9, wherein the keycap is less than six (6) millimeters in height.

12. The keyboard of claim 9, wherein a color of the dielectric between a specific top electrode and a corresponding bottom electrode changes when a differential voltage is applied between the specific top electrode and the corresponding bottom electrode.

13. The keyboard of claim 12, wherein the keycap further includes:
   a mask over the front plane elements, wherein the mask includes a plurality of exposed areas to allow for selective visibility of the dielectric.

14. The keyboard of claim 13, wherein each of the plurality of exposed areas can be image, symbol, letter, or number.

15. A method, comprising:
   creating a keycap for a key on a keyboard, the keycap including:
      a plurality of front plane elements, wherein each front plane element includes a top electrode;
      a conductive region under each of the plurality of front plane elements, wherein each conductive region includes a bottom electrode and a top electrode coupling area, wherein each top electrode coupling area is electrically coupled to a common top electrode connection;
      an electrical path between each top electrode and each corresponding top electrode coupling area such that each top electrode is connected to the common top electrode connection; and
      a dielectric between each top electrode and each bottom electrode.

16. The method of claim 15, wherein the keycap is less than six (6) millimeters in height.

17. The method of claim 15, wherein a color of the dielectric between a specific top electrode and a corresponding bottom electrode changes when a differential voltage is applied between the specific top electrode and the corresponding bottom electrode.

18. The method of claim 17, wherein the keycap further includes:
   a mask over the front plane elements, wherein the mask includes a plurality of exposed areas to allow for selective visibility of the dielectric.

19. The method of claim 18, wherein each of the plurality of exposed areas can be an image, symbol, letter, or number.

20. A system, comprising:
   a processor;
   memory;
   a first housing, wherein the first housing includes a display;

a second housing, wherein the second housing includes keyboard, wherein the keyboard includes a plurality of keys and at least a portion of the plurality of keys includes a keycap, wherein the keycap includes:
- a plurality of front plane elements, wherein each front plane element includes a top electrode;
- a conductive region under each of the plurality of front plane elements, wherein each conductive region includes a bottom electrode and a top electrode coupling area, wherein each top electrode coupling area is electrically coupled to a common top electrode connection;
- an electrical path between each top electrode and each corresponding top electrode coupling area such that each top electrode is connected to the common top electrode connection; and
- a dielectric between each top electrode and each bottom electrode.

21. The system of claim 20, wherein a thickness of the top electrode, the dielectric, and the bottom electrode is less than about three (3) millimeters.

22. The system of claim 20, wherein the keycap is less than six (6) millimeters in height.

23. The system of claim 20, wherein a color of the dielectric between a specific top electrode and a corresponding bottom electrode changes when a differential voltage is applied between the specific top electrode and the corresponding bottom electrode.

24. The system of claim 23, wherein the keycap further includes:
- a mask over the front plane elements, wherein the mask includes a plurality of exposed areas to allow for selective visibility of the dielectric.

25. The system of claim 24, wherein each of the plurality of exposed areas can be an image, symbol, letter, or number.

* * * * *